(12) United States Patent
Yilmaz et al.

(10) Patent No.: US 11,304,088 B2
(45) Date of Patent: Apr. 12, 2022

(54) DYNAMIC LINK SELECTION

(71) Applicant: TELEFONAKTIEBOLAGET LM ERICSSON (PUBL), Stockholm (SE)

(72) Inventors: Osman Nuri Can Yilmaz, Espoo (FI); Stefan Wager, Espoo (FI); Riikka Susitaival, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 16/325,165

(22) PCT Filed: Aug. 14, 2017

(86) PCT No.: PCT/IB2017/001137
§ 371 (c)(1),
(2) Date: Feb. 12, 2019

(87) PCT Pub. No.: WO2018/029537
PCT Pub. Date: Feb. 15, 2018

(65) Prior Publication Data
US 2019/0174353 A1 Jun. 6, 2019

Related U.S. Application Data

(60) Provisional application No. 62/476,302, filed on Mar. 24, 2017, provisional application No. 62/374,152, filed on Aug. 12, 2016.

(51) Int. Cl.
*H04W 28/02* (2009.01)
*H04W 28/08* (2009.01)
(Continued)

(52) U.S. Cl.
CPC ....... *H04W 28/0278* (2013.01); *H04W 28/08* (2013.01); *H04W 76/15* (2018.02);
(Continued)

(58) Field of Classification Search
CPC ............ H04L 12/10; H04L 2012/2841; H04L 12/2803; H04W 4/33
See application file for complete search history.

(56) References Cited

U.S. PATENT DOCUMENTS

| | | | |
|---|---|---|---|
| 2013/0194933 A1* | 8/2013 | Celik | H04L 1/1685 370/242 |
| 2015/0358957 A1 | 12/2015 | Kim et al. | |
| 2016/0302075 A1* | 10/2016 | Dudda | H04W 12/1006 |

FOREIGN PATENT DOCUMENTS

| | | |
|---|---|---|
| JP | 2016509791 A | 3/2016 |
| RU | 2571617 C2 | 12/2015 |

(Continued)

OTHER PUBLICATIONS

Ericsson: "Overview of RRC architecture options for the LTE-NR tight networking," R2-164005—Overview of RRC Architecture Options for the LTE-NR Tight Interworking, vol. RAN WG2, No. Nanjing, P.R. China; 20160523-20160527, (May 22, 2016), XP051105340, (Year: 2016).*

Electronics Inc: "PDCP data indication to MAC with threshold," R2-153148 PDCP Data Indication To MAC With Threshold, vol. RAN WG2, No. Beiing, China; 20150824-20150828, (Aug. 4, 2015), XP050991628 (Year: 2015).*

(Continued)

*Primary Examiner* — Walter J Divito

(57) ABSTRACT

A method for dynamic link selection that comprises providing at least two wireless links between one or more network nodes and a wireless device. The at least two wireless links associated with at least two different radio access technologies. The method additionally includes obtaining control data to be sent to a first network node of the one or more network nodes. The control data is associated with a first radio access technology. The method additionally includes selecting one or more wireless links from among the at least two wireless links. The one or more links selected based on a first selection parameter. The one or more selected wireless links are to be used for the transmission of the control data to the first network node. The one or more selected wireless (Continued)

links comprise at least a first wireless link associated with a second radio access technology. The method further includes transmitting the control data associated with the first radio access technology to the first network node via at least the first wireless link associated with the second radio access technology. The method also includes obtaining the control data at the first network node and determining whether the received control data is duplicated control data.

26 Claims, 5 Drawing Sheets

(51) Int. Cl.
*H04W 76/15* (2018.01)
*H04W 92/20* (2009.01)
*H04W 36/14* (2009.01)
*H04W 36/18* (2009.01)

(52) U.S. Cl.
CPC ........ *H04W 28/0236* (2013.01); *H04W 36/14* (2013.01); *H04W 36/18* (2013.01); *H04W 92/20* (2013.01)

(56) References Cited

FOREIGN PATENT DOCUMENTS

| WO | 2013126859 | A2 | 8/2013 | |
| WO | WO-2013126859 | A2 * | 8/2013 | ............ H04W 88/06 |
| WO | 2015060544 | A1 | 4/2015 | |
| WO | 2015067823 | A1 | 5/2015 | |

OTHER PUBLICATIONS

Ericsson, Overview of RRC architecture options for the LTE-NR tight interworking, Tdoc R2-164005, 3GPP TSG-RAN WG2 #94, Nanjing, P.R. China, May 23-27, 2016.
LG Electronics Inc., PDCP data indication to MAC with threshold, R2-153148, 3GPP TSG-RAN WG2 Meeting #91, Beijing, China, Aug. 24-28, 2015.
Ericsson, Split SRB: Other issues, Tdoc R2-1700910, 3GPP TSG-RAN WG2 #97, Athens, Greece, Feb. 13-17, 2017.
Ericsson, Split SRB: Remaining issues, Tdoc R2-1702707, 3GPP TSG-RAN WG2 #97bis, Spokane, USA, Apr. 3-7, 2017.
Ericsson, RRC diversity, Tdoc R2-166776, 3GPP TSG-RAN WG2 #95bis, Kaohsiung, Taiwan, Oct. 10-14, 2016.

* cited by examiner

DYNAMIC LINK SELECTION

This application is a 371 of International Application No. PCT/IB2017/001137, filed Aug. 14, 2017, which claims priority to U.S. Application No. 62/476,302, filed Mar. 24, 2017, and claims priority to U.S. Application No. 62/374,152, filed Aug. 12, 2016, the disclosures of which are fully incorporated herein by reference.

TECHNICAL FIELD

Embodiments presented herein relate to dynamic link selection, and in particular to methods, network nodes, wireless devices, computer programs, or computer program products for selecting one or more wireless links to use to transmit data.

BACKGROUND

Overall requirements for the Next Generation (NG) architecture for wireless networks (see TR 23.799, Study on Architecture for Next Generation) and, more specifically the NG Access Technology (see TR 38.913, Study on Scenarios and Requirements for Next Generation Access Technologies) will impact the design of 5G (also referred to as New Radio (NR)) (see RP-160671, New SID Proposal: Study on New Radio Access Technology, DoCoMo) from mobility to control plane design and mechanisms.

In Long Term Evolution (LTE), it was discussed during the Dual Connectivity (DC) study item to support sending Radio Resource Control (RRC) messages via both Master Evolved Node B (eNB) (MeNB) and Secondary eNB (SeNB), which is referred to as "RRC diversity". In these studies, it was shown that RRC diversity could provide notable gains in case of multi-layer (inter-frequency) DC scenarios (see 3GPP TR 36.842, Study on Small Cell enhancements for E-UTRA and E-UTRAN; Higher layer aspects (Release 12), December 1113). However, due to lack of time, RRC diversity was down prioritized and left out of the work item.

In NR, the requirements (see R2-163993, NR/LTE tight-interworking: CP requirements on Mobility and Dual Connectivity, Ericsson, RAN2#94, 23-27 May 1216) set on Ultra-Reliable and Low Latency Communications (URLLC) services suggest a revisit of RRC diversity once again for multi-layer deployments. In this context, the applicability of a wider set of numerologies and larger range of frequencies could make RRC diversity an even more desirable feature than before. This is because, for instance, while a lower-frequency LTE layer could provide better control plane coverage, a higher-frequency NR layer, thanks to its envisioned Radio Access Technology (RAT) design, may provide faster delivery of a control plane message. In addition, RRC diversity can particularly help improve mobility robustness as discussed within the earlier LTE studies.

U.S. patent application Ser. No. 15/035,729 "DISCARDING A DUPLICATE PROTOCOL DATA UNIT ASSOCIATED WITH A DATA TRANSMISSION VIA A FIRST SIGNALING RADIO BEARER OR A SECOND SIGNALING RADIO BEARER", describes the receiver algorithm for duplicate discard for RRC diversity with splitting done by the Packet Data Convergence Protocol (PDCP). It defines how PDCP Protocol Data Units (PDUs) are duplicated using the same sequence number X, and in the receiver the sequence number is used to remove duplications.

RRC diversity is envisioned for both the downlink and uplink to address the aforementioned challenges related to URLLC and mobility robustness. However, how dynamic link selection should be realized is still an open question.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

SUMMARY

An object of embodiments herein is to provide methods, wireless devices, and network nodes that are able to perform dynamic link selection. According to certain embodiments, a method for dynamic link selection comprises providing at least two wireless links between one or more network nodes and a wireless device. The at least two wireless links are associated with at least two different radio access technologies. The method additionally includes obtaining control data that is to be sent to a first network node of the one or more network nodes. The control data is associated with a first radio access technology. The method further includes selecting one or more wireless links from among the at least two wireless links. The one or more wireless links may be selected based on a first selection parameter. The selected one or more wireless links are to be used for the transmission of the control data to the first network node. The selected one or more wireless links includes at least a first wireless link that is associated with a second radio access technology. The method also includes transmitting the control data associated with the first radio access technology to the first network node via at least the first wireless link associated with the second radio access technology. The method additionally includes obtaining the control data at the first network node and determining whether the received control data is duplicated control data.

According to some embodiments, a method for dynamic link selection comprises obtaining data to be sent to a network node. The method additionally includes selecting one or more wireless links to use for the transmission of the data to be sent to the network node. The one or more wireless links may be selected from a group of at least two available wireless link that are associated with at least two different radio access technologies. The method further includes transmitting the data to the network node via the selected one or more wireless links.

In some embodiments, the data that is to be sent comprises control data for a first wireless link of the at least two available wireless links. The first wireless link is associated with a first radio access technology. In such embodiments, the method may also include transmitting the control data to the network node via at least a second wireless link of the at least two available wireless links. The second wireless link is associated with a second radio access technology that is different than the first radio access technology.

In certain embodiments, the method also includes, upon selecting at least two wireless links from the group of at least two available wireless links, replicating the data to be transmitted. In such embodiments, the method may further include transmitting the replicated data to the network node via the at least two selected wireless links such that the at least two selected wireless links convey the same data via different radio access technologies. In some instances, the data transmitted on at least one of the selected wireless links is transmitted to the network node via a second network node.

In some embodiments, selecting one or more wireless links to use for the transmission of the data comprises evaluating a link quality associated with each of the wireless links. In certain embodiments selecting one or more wireless links to use for the transmission of the data comprises evaluating buffer status associated with each of the wireless links.

In certain embodiments, the data that is to be sent is control plane data. In particular embodiments, transmitting the data comprises, for each selected wireless link, forwarding a Packet Data Convergence Protocol (PDCP) Protocol Data Unit (PDU) to a respective lower layer link.

In some embodiments, selecting the one or more wireless links is done on a per PDCP PDU basis. In some embodiments selecting the one or more wireless links is done on a per Radio Link Control (RLC) PDU basis. In some embodiments, the data comprises Radio Resource Control (RRC) messages.

In accordance with particular embodiments, a wireless device for dynamic link selection comprises processing circuitry. The processing circuitry is configured to obtain data to be sent to a network node. The processing circuitry is further configured to select one or more wireless links to use for the transmission of the data to be sent to the network node. The one or more wireless links are selected from a group of at least two available wireless links. The at least two available wireless links are associated with at least two different radio access technologies. The wireless device additionally includes a wireless interface that is configured to transmit the data to the network node via the selected one or more wireless links. The wireless device further includes a power source configured to provide the wireless device with power. The wireless device additionally includes a user interface.

In accordance with certain embodiments, a network node for dynamic link selection comprises a wireless interface that is configured to provide at least a first wireless link for wireless communication with a wireless device. The first wireless link is associated with a first radio access technology. The network node additionally includes a second interface configured to obtain control data from the wireless device. The control data is transmitted by the wireless device via a second wireless link. The second wireless link is associated with a second radio access technology different than the first radio access technology. The network node additionally includes processing circuitry that is configured to determine whether the received control data is duplicated control data.

In accordance with some embodiments, a wireless device for dynamic link selection comprises a processor and computer readable storage media. The storage media contains instructions that are executable by the processor. When executed the wireless device is operative to obtain data to be sent to a network node. The wireless device is further operative to select one or more wireless links to use for the transmission of the data to be sent to the network node. The one or more wireless links are selected from a group of at least two available wireless links. The at least two available wireless links are associated with at least two different radio access technologies. The wireless device is additionally operative to transmit the data to the network node via the selected one or more wireless links.

In accordance with particular embodiments, a wireless device for dynamic link selection comprises an obtain unit configured to obtain data to be sent to a network node. The wireless device additionally includes a selection unit configured to select one or more wireless links to use for the transmission of the data to be sent to the network node. The one or more wireless links are selected from a group of at least two available wireless links. The at least two available wireless links are associated with at least two different radio access technologies. The wireless device additionally includes a transmit unit configured to transmit the data to the network node via the selected one or more wireless links.

Advantageously, one or more embodiments provided herein improve radio resource (e.g., spectrum, power, etc.) utilization and robustness in wireless networks. In some embodiments, dynamic link selection can improve the use of the resources belonging to multiple different radio access technologies (RATs) by adding in the selection for whether to send the control plane (SRB) data on multiple links or one of the links.

It is to be noted that any feature of any of the above embodiments may be applied to any other embodiment, wherever appropriate. Likewise, any advantage of any of the embodiments may apply to the other embodiments, and vice versa. Other objectives, features and advantages of the enclosed embodiments will be apparent from the following detailed disclosure, attached claims, and drawings.

BRIEF DESCRIPTION OF THE DRAWINGS

Particular embodiments are now described, by way of example, with reference to the accompanying drawings, in which.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example to help convey the scope of the inventive concept to those skilled in the art. Like numbers refer to like elements throughout the description.

Figure 1:
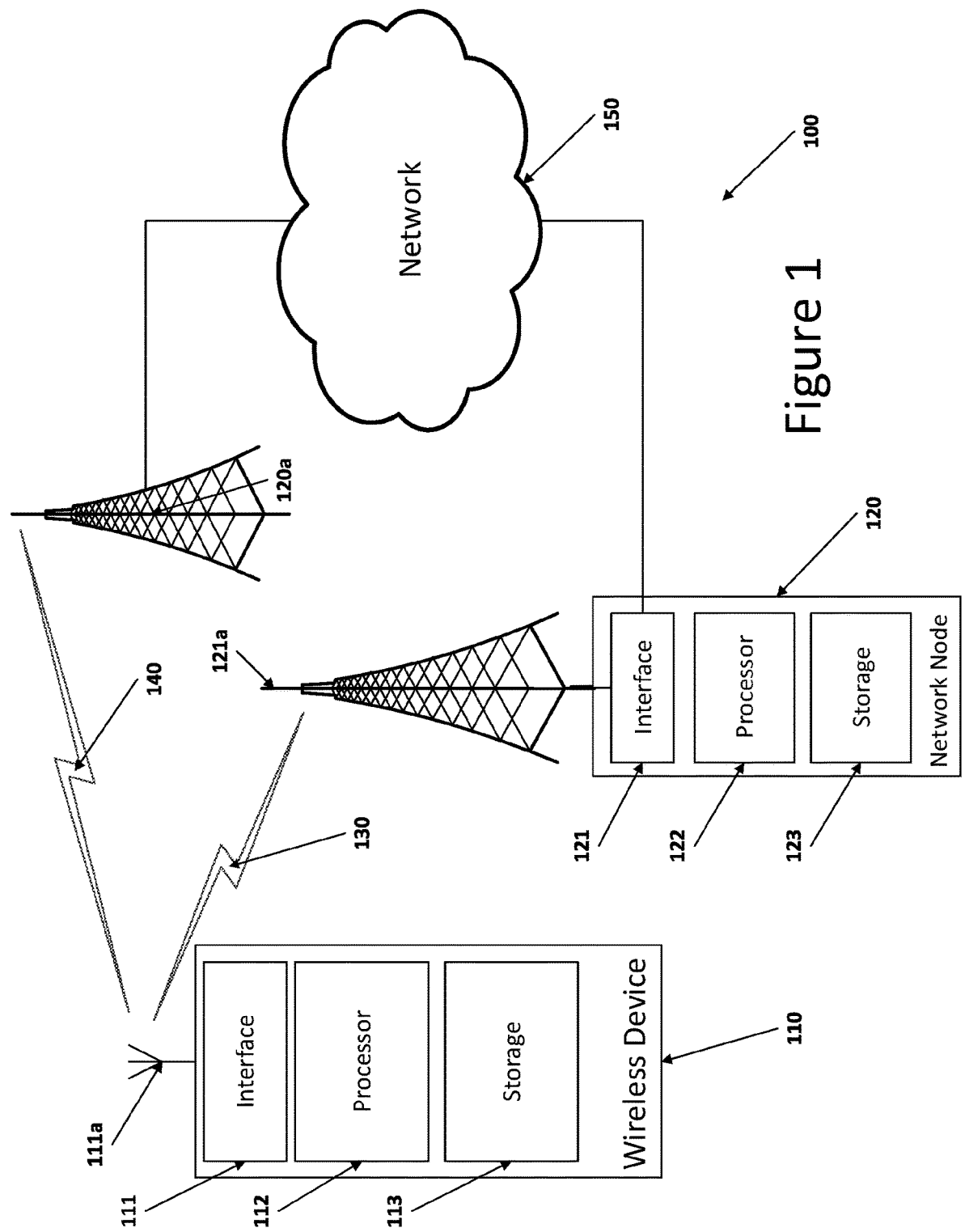
FIG. 1 is a schematic block diagram illustrating a wireless network according to particular embodiments.

FIG. 1 is a schematic block diagram illustrating a wireless network according to particular embodiments. Although the embodiments described herein may be implemented in any appropriate type of system using any suitable type and number of components, particular embodiments may be implemented in a wireless network such as the example wireless communication network illustrated in FIG. 1. In the example embodiment of FIG. 1, the wireless communication network provides communication and other types of wireless services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone or a remote server.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the World-wide Interoperability for Microwave Access (WiMax), Bluetooth, and/or ZigBee standards. These various disparate standards may be referred to herein generally as Radio Access Technologies (RATs).

Network 150 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Illustrated in FIG. 1 is a more detailed view of network node 120 and wireless device (WD) 110, in accordance with a particular embodiment. For simplicity, FIG. 1 only depicts network 150, network nodes 120 and 120a, and WD 110. These components may work together in order to provide network node and/or wireless device functionality, such as providing wireless connections, or links, in a wireless network. These components may also work to provide dynamic link selection. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network node 120 may include any equipment capable, configured, arranged and/or operable to communicate directly or indirectly with a wireless device and/or with other equipment in the wireless communication network that enable and/or provide wireless access or services via wireless links to WD 110. For example, network node 120 may be an access point (AP), in particular a radio access point. Network node 120 may represent base stations (BSs), such as radio base stations. Particular examples of radio base stations include Node Bs, and evolved Node Bs (eNBs). In general, base stations may be categorized based on the amount of coverage they provide (or, stated differently, their transmit power level) and may then also be referred to as femto base stations, pico base stations, micro base stations, or macro base stations. Network node 120 may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). As a particular non-limiting example, a base station may be a relay node or a relay donor node controlling a relay.

In yet further examples, network node 120 may include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs.

In FIG. 1, Network node 120 comprises interface 121, processor 122, storage 123, and antenna 121a. These components are depicted as single boxes located within a single larger box. In practice however, a network node may comprise multiple different physical components that make up a single illustrated component (e.g., interface 121 may comprise terminals for coupling wires for a wired connection and a radio transceiver for a wireless connection). As another example, network node 120 may be a virtual network node in which multiple different physically separate components interact to provide the functionality of network node 120 (e.g., processor 122 may comprise three separate processors located in three separate enclosures, where each processor is responsible for a different function for a particular instance of network node 120). Similarly, network node 120 may be composed of multiple physically separate components (e.g., a NodeB component and an RNC component, a BTS component and a BSC component, etc.), which may each have their own respective processor, storage, and interface components. In certain scenarios in which network node 120 comprises multiple separate components (e.g., BTS and BSC components), one or more of the separate components may be shared among several network nodes. For example, a single RNC may control multiple NodeB's. In such a scenario, each unique NodeB and BSC pair, may be considered a separate network node. In some embodiments, network node 120 may be configured to support multiple radio access technologies (RATs). In such embodiments, some components may be duplicated (e.g., separate storage 123 for the different RATs) and some components may be reused (e.g., the same antenna 121a may be shared by the RATs).

Processor 122 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 120 components, such as storage 123, network node 120 functionality. For example, processor 122 may execute instructions stored in storage 123. Such functionality may include providing various wireless features discussed herein to a wireless device, such as WD 110, including any of the features or benefits disclosed herein.

Storage 123 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 123 may store any suitable instructions, data or information, including software and encoded logic, utilized by network node 120. Storage 123 may be used to store any calculations made by processor 122 and/or any data received via interface 121.

Network node 120 also comprises interface 121 which may be used in the wired or wireless communication of signalling and/or data between network node 120, network 150, and/or WD 110. For example, interface 121 may perform any formatting, coding, or translating that may be needed to allow network node 120 to send and receive data from network 150 over a wired connection. Interface 121 may also include a radio transmitter, receiver and/or transceiver that may be coupled to or a part of antenna 121*a*. The radio may receive digital data that is to be sent out to other network nodes or WDs via a wireless connection. The radio may convert the digital data into a radio signal having the appropriate channel and bandwidth parameters. The radio signal may then be transmitted via antenna 121*a* to the appropriate recipient (e.g., WD 110).

Antenna 121*a* may be any type of antenna capable of transmitting and receiving data and/or signals wirelessly. In some embodiments, antenna 121*a* may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 110 may represent any device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, WD 110 may be configured to transmit and/or receive information without direct human interaction. For instance, WD 110 may be designed to transmit information to a network on a predetermined schedule, when triggered by an internal or external event, or in response to requests from the network. Generally, WD 110 may represent any device capable of, configured for, arranged for, and/or operable for wireless communication, for example radio communication devices. Examples of wireless devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

Figure 2:
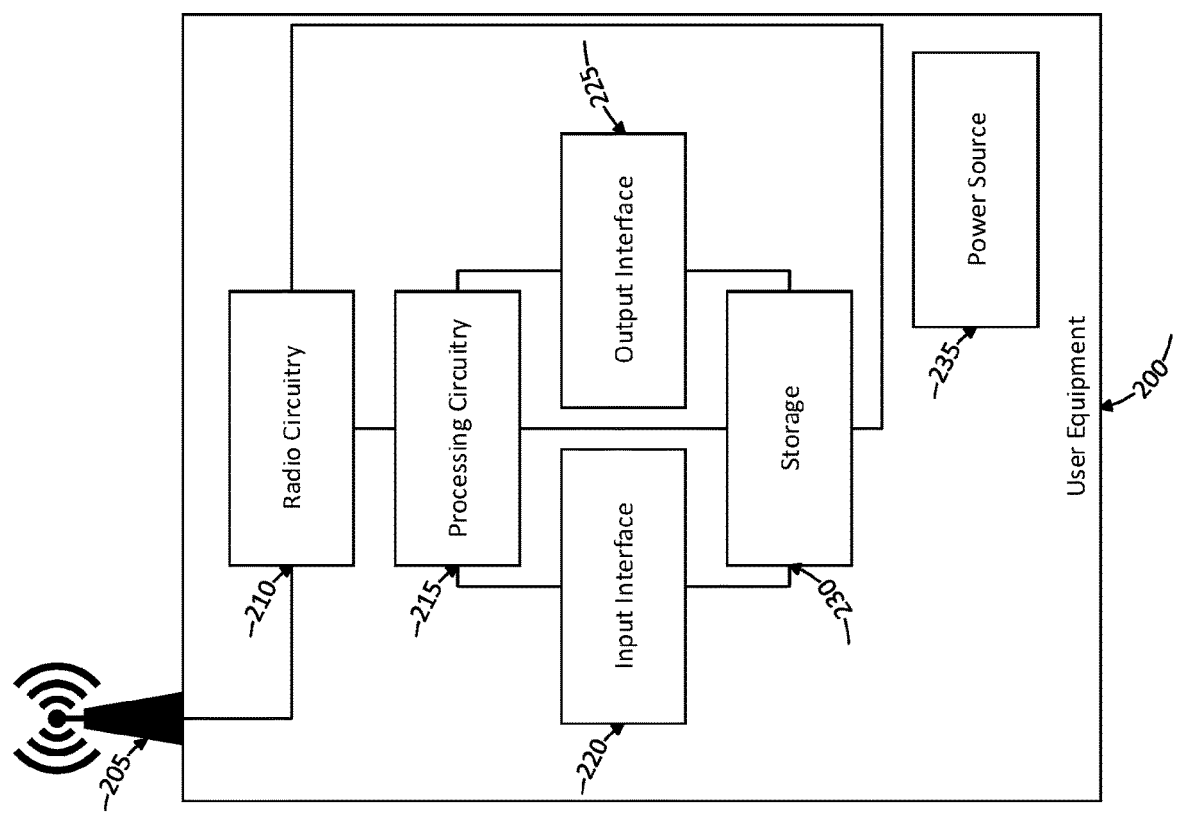
FIG. 2 is a schematic block diagram illustrating a user equipment according to particular embodiments.

As one specific example, WD 110 may represent a UE, such as UE 200 of FIG. 2, configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user. The wireless device may support device-to-device (D2D) communication, for example by implementing a 3GPP standard for sidelink communication, and may in this case be referred to as a D2D communication device.

As yet another specific example, in an Internet of Things (IOT) scenario, WD 110 may represent a machine or other device that performs monitoring and/or measurements, and transmits the results of such monitoring and/or measurements to another wireless device and/or a network node. WD 110 may in this case be a machine-to-machine (M2M) device, which may in a 3GPP context be referred to as a machine-type communication (MTC) device. As one particular example, WD 110 may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, personal wearables such as watches etc.). In other scenarios, WD 110 may represent a vehicle or other equipment that is capable of monitoring and/or reporting on its operational status or other functions associated with its operation.

A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 1, WD 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 120 and/or other WDs. WD 110 comprises interface 111, processor 112, storage 113, and antenna 111*a*. The components of WD 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

Processor 112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 110 components, such as storage 113, WD 110 functionality. Such functionality may include providing various wireless features discussed herein, including any of the features or benefits disclosed herein.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by WD 110. Storage 113 may be used to store any calculations made by processor 112 and/or any data received via interface 111.

Interface 111 may be used in the wireless communication of signalling and/or data between WD 110 and network node 120. For example, interface 111 may perform any formatting, coding, or translating that may be needed to allow WD 110 to send and receive data from network node 120 over a wireless connection. Interface 111 may also include a radio transmitter and/or receiver that may be coupled to or a part of antenna 111a. The radio may receive digital data that is to be sent out to network node 121 via a wireless connection. The radio may convert the digital data into a radio signal having the appropriate channel and bandwidth parameters. The radio signal may then be transmitted via antenna 111a to network node 120. Interface 111 may also include a user interface comprising an input interface (such as input interface 220 and an output interface such as output interface 225).

Antenna 111a may be any type of antenna capable of transmitting and receiving data and/or signals wirelessly. In some embodiments, antenna 111a may comprise one or more omni-directional, sector or panel antennas operable to transmit/receive radio signals between 2 GHz and 66 GHz. For simplicity, antenna 111a may be considered a part of interface 111 to the extent that a wireless signal is being used.

The various components of the various devices illustrated FIG. 1 may be used in providing dynamic link selection. Dynamic link selectin may also be performed by devices and/or components not specifically illustrated herein but which are known to provide similar features or capabilities as discussed herein. Below, the following examples and explanations of the features, benefits and components will mostly be described with respect to how dynamic link selection could be made for control plane (CP) transmissions. However, similar features and benefits may be applicable to user plane (UP) transmissions as well. In describing the illustrated components and how they may be used in different embodiments to provide dynamic link selection it may be assumed that wireless device 110 has established wireless link 130 with network node 120 and wireless link 140 with network node 120a. It may further be assumed that these two wireless links are based on different radio access technologies. For example, wireless link 130 may be based on LTE and wireless link 140 may be based on WiMax. As another example, wireless link 130 may be based on NR and wireless link 140 may be based on WiFi. Any of a variety of other combinations may be possible depending on the capabilities and features of the wireless interface of wireless device 110.

In one embodiment, processor 112 of wireless device 110 may comprise processing circuitry. The processing circuitry may obtain data that is to be sent via interface 111 to network node 120. The data that is to be sent can take a variety of forms and may be obtained through different sources. For example, in some embodiments the data may be control data (e.g., control plane data, radio resource control (RRC) data, etc.) generated by processor 112. In another example, the data may be user data (e.g., user plane data such as data entered by a user, data generated by one or more programs being executed by wireless device 110 etc.) received through a user interface of wireless device 110 or some program or application be run by processor 112.

Processor 112 may then select wireless link 130 and/or 140 to use to transmit the data to network node 120. Processor 112 may examine channel conditions, buffer status, and/or link quality of the possible wireless links 130 and 140 which may be used for transmission of the data. Link selection may be based on the absolute values or the relative values. For example, in some scenarios the channel conditions and/or link quality for wireless links 130 and 140 may be such that processor 112 may select wireless link 140 to send control data to base station 120 even though wireless link 140 is associated with a different radio access technology than what is provided by base station 120. In some instances, processor 112 may select multiple wireless links to use to send the data. For example, processor 112 may select both wireless links 130 and 140 to use to send the data to network node 120.

Figure 4:
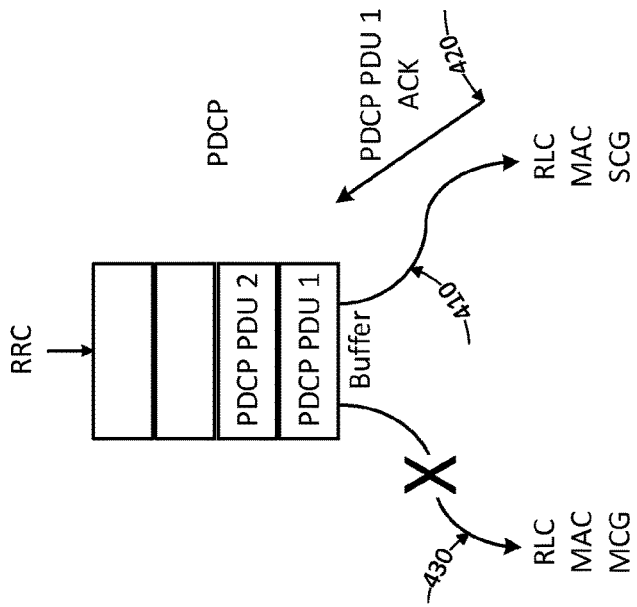
FIG. 4 is a block diagram illustrating lower layer feedback according to particular embodiments.

In some embodiments, processor 112 may use lower layer feedback messages to evaluate link quality. This can be seen in FIG. 4. For example, if acknowledgement message 420 is received on wireless link 410 for PDU 1, then processor 112 may determine that wireless link 430 is not as desirable as wireless link 410, even though wireless link 430 is associated with the master cell group (e.g., the cell with which the data is associated). In some embodiments, if the lower layer (RLC/MAC) indicates a successful delivery of PDCP PDU(s), then processor 112 of WD 110 may, at the PDCP level, discard the PDU without forwarding it to the lower layers or waiting for a second indication from another link.

If multiple wireless links are selected, processor 112 may need to replicate the processing of the data so that it is suitable for transmission via the multiple wireless links. For example, processor may duplicate the data. As another example, processor 112 may replicate the packaging of the data (e.g., formatting, headers, packetization, etc.). In replicating the packaging of the data, the process is repeated although the actual information may change. That is, processor 112 may create a second header, but that header may contain a different address. Processor 112 may select the wireless links on which to send the data on a per Packet Data Convergence Protocol (PDCP) Protocol Data Unit (PDU) basis. That is, processor 112 may select wireless link 130 to send a first PDCP PDU and then select wireless link 140 to send the immediately subsequent PDCP PDU. In some embodiments, processor 112 may select the wireless links to use to send the data on a per Radio Link Control (RLC) PDU basis.

Interface 111 may comprise a wireless interface that is able to send the data via the selected wireless link. For example, if processor 112 selects wireless link 140 to send the data to network node 120, and wireless link 140 is an LTE link, then interface 111 may comprise the radio, transmitter, or other such interface components needed to transmit an LTE message via wireless link 140. As can be seen in FIG. 1, in order for the data sent via wireless link 140 to get to network node 120 it must first be received by network node 120a and then forwarded on to network node 120.

Figure 3:
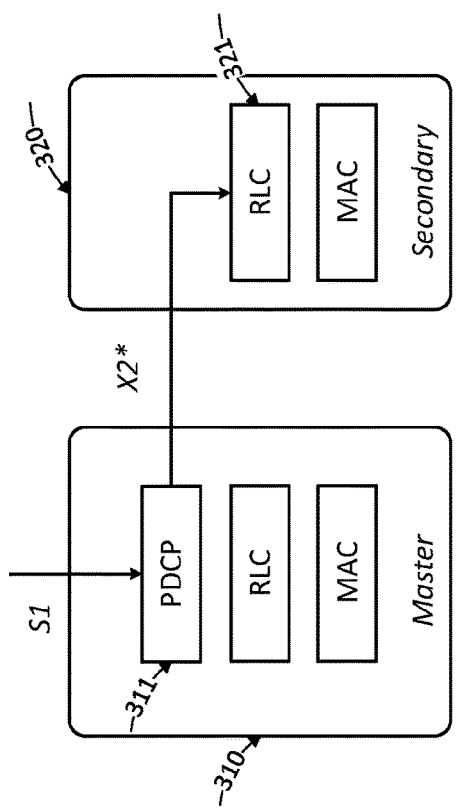
FIG. 3 is a block diagram illustrating RRC diversity according to particular embodiments.
Figure 5:
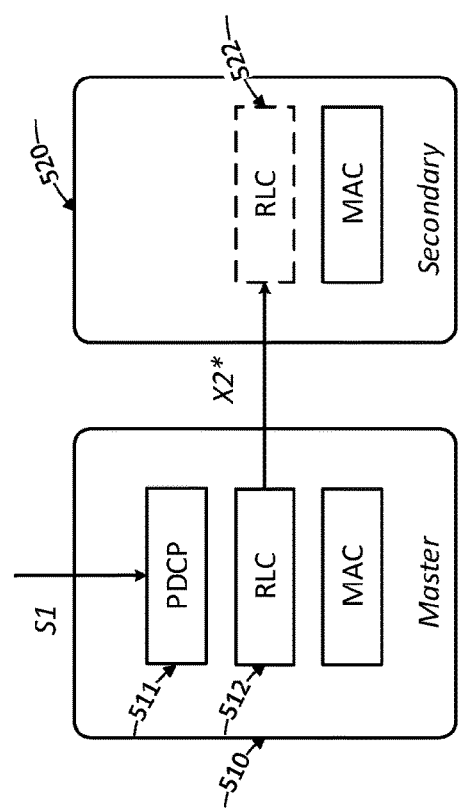
FIG. 5 is a block diagram illustrating an RLC split according to particular embodiments.

Interface 111 may comprise a wireless interface that is able to receive data via one or both of wireless links 130 and 140. This can be seen in better detail in FIGS. 3 and 5 wherein FIG. 3 is a block diagram illustrating RRC diversity at the PDCP level and FIG. 5 is a block diagram illustrating RRC diversity at the RLC level. With respect to FIG. 3, RRC diversity is realized based on a PDCP level split. When data intended for WD 110 is received by the primary or master network node 310, and RRC diversity is active at the PDCP level 311, master network node 310 may send the data to secondary network node 320 via inter-node interface X2* where it is received and processed at RLC 321 of secondary network node 320. As the data is forwarded to lower layers in the two network nodes, it eventually is transmitted over wireless links 130 and 140 enabling interface 111 to receive the data. In some scenarios, the data initially received by master network node 310 may only be transmitted by secondary network node 320. The selection of one, or the other, or both wireless links may be made on a PDU basis (RRC PDU or SDU, or PDCP PDU). With respect to FIG. 5, master network node 510 receives the data, but in this scenario PDCP 511 forwards the data to RLC 512 and then the data is sent to RLC 522 via inter-node interface X2*. In FIG. 5, RRC diversity architecture when RLC split is used, RLC 512 with solid lines denotes the master RLC where the RRC diversity/split is realized. RLC 522 with dashed lines refers to the secondary or slave RLC which handles the basic RLC functions at secondary network node 520.

In FIGS. 3 and 5, inter-node interface X2* represents the inter-node interface between master network node 310/510 and secondary network node 320/520. Inter-node interface X2* may be used to send and receive messages, information, and/or other data between the network nodes. For example, if interface 121 of network node 120 receives data from WD 110 that is intended for network node 120a, interface 121 may forward the data on to network node 120a via inter-node interface X2*. Inter-node interface X2* may represent a wired or wireless connection that may involve any number of hops between the two base stations.

In certain embodiments, processor 112 and storage 113 may be used to map PDUs to the lower layer links in the context of RRC diversity. In some embodiments, the control plane architecture of signalling radio bearer (SRB) level split at the PDCP protocol layer may be adopted. In certain embodiments, other protocol layers such as RLC (see FIG. 5) or medium access control (MAC) can also enable RRC diversity. The embodiments disclosed herein are not limited to the given architecture examples, and the basic principles can be realized with little impact from the selected architecture option. In some embodiments, before RRC diversity can be activated, processor 112 and interface 111 may need to configure the respective wireless links and enable the certain security features of the respective RAT. This may occur during the initial connection setup or connection re-establishment.

In some embodiments, processor 112 of WD 110 may make link selection decisions on a per RRC PDU/SDU basis. For example, processor 112 can make the decision based on the RRC message type. For example, a HO command could be sent on both wireless links 130 and 140 by the lower layers.

In another embodiment, processor 112 may make the link selection decision on a per PDCP PDU basis. In this case a PDCP entity can make the decision based on the services provided by lower layers, for instance, this could be simply an indication of successful delivery of PDCP PDUs. In some implementations, the service could be simply the dynamic link selection decision itself; or a measurement indication or measurement report that can be used for the mapping.

In some of the embodiments, where the link selection decision is made on a per PDCP PDU basis, processor 112 may default to mapping control plane data to both/all configured wireless links. This may provide diversity and improved robustness for the control plane data. In another embodiment, such as where RRC diversity is realized by an RLC-level split, dynamic link selection may be made on a per RLC PDU basis or by higher layers (e.g., PDCP PDU or RRC PDU/SDU basis).

In some embodiments, dynamic link selection could be implementation specific (e.g., for the downlink) and standardized (e.g., for the uplink). This may improve the predictability of the behaviour of WD 110. This may also allow, for example, for the signal quality and latency aspects of each link to be taken into account for the rules of dynamic link selection. In some embodiments, processor 112 may select which link or links to use based on at least one of a measurement and measurement report. In certain embodiments, the link selection decision can be made in the transmitter side (network node 120 for downlink (DL) and WD 110 for uplink (UL)). Alternatively, network node 120 may control the decision in both directions by sending commands to transmitting entity. The command can be sent on the physical, MAC, PDCP or RRC layer.

In some embodiments, processor 112 may use measurements for a reverse link to make a link selection. This may be suitable where channel reciprocity can be utilized. For example, processor 112 may perform downlink measurements (e.g., signal strength) for data received from network node 120. The measurement values may then be used in selecting which wireless links interface 111 may use to for uplink data transmission to network node 120.

In some embodiments, interface 111 may prepare the data for transmission. Where data is being transmitted via multiple links, the data may be prepared separately or independently for each wireless link to be used to transmit the data. For example, for each selected wireless link, interface 111 may forward a PDCP PDU to a respective lower layer link. In doing so, processor 112 and storage 113 may be used to replicate the data that is being sent to each of the respective lower layers.

Interface 121 of network node 120 may receive the data either directly from wireless device 110, via wireless link 130, or indirectly from network node 120a. Different components of interface 121 may be used depending on where the data is received. That is, wireless interface components may be used to receive the data via wireless link 130, while a wired interface component may be used to receive the data indirectly from network node 120a.

Processor 122 may comprise processing circuitry to analyse data received by interface 121. For example, because interface 121 may receive data that wireless device 110 has sent through multiple wireless links, network node 120 may receive duplicate data. Accordingly, processor 122 may examine the received data to determine whether it is duplicate data. For example, if interface 121 first receives data from wireless link 130 it may determine that it is not duplicate data. Then, if interface 121 receives the same data from network node 120a, processor 122 may determine that it is duplicate data. In some embodiments, the duplicate data may be discarded. In some embodiments, the duplicate data may be combined to avoid having to request a retransmission.

Another form of analysis processor 122 may perform is to determine whether to keep the data for processing internally or to forward the data to network node 120a. That is, because wireless device 110 may use wireless link 130 to send data, such as control data, intended for network node 120a. Processor 122 may need to determine whether the data received via wireless link 130 is for network node 120 or network node 120a. If the received data is for network node 120a, interface 121 may prepare and transmit the data towards network node 120a. Interface 121 may use different components to receive the data from wireless device 110 and to forward the data towards network node 120a.

FIG. 2 is a schematic block diagram of a user equipment according to particular embodiments. User Equipment (UE) 200 is a type of a wireless device. UE 200 includes an antenna 205, radio front-end circuitry 210, processing circuitry 215, input interface 220, output interface 225, computer-readable storage medium 230, and power source 235. Antenna 205 may include one or more antennas or antenna arrays, and is configured to send and/or receive wireless signals, and is connected to radio front-end circuitry 210. In certain alternative embodiments, UE 200 may not include antenna 205, and antenna 205 may instead be separate from UE 200 and be connectable to UE 200 through an interface or port.

Radio front-end circuitry 210, along with antenna 205, may be considered part of an interface, or more specifically a wireless interface. Radio front-end circuitry 210 may comprise various filters and amplifiers used in generating or decoding a radio signal. Radio front-end circuitry 210, is connected to antenna 205 and processing circuitry 215. Radio front-end circuitry 210 is configured to condition signals communicated between antenna 205 and processing circuitry 215. In certain alternative embodiments, UE 200 may not include a discrete radio front-end circuitry 210, rather processing circuitry 215 may instead be connected to antenna 205 without radio front-end circuitry 210.

Processing circuitry 215 may include one or more of radio frequency (RF) transceiver circuitry, baseband processing circuitry, and application processing circuitry. In some embodiments, the RF transceiver circuitry, baseband processing circuitry, and application processing circuitry may be on separate microchips or sets of chips. In alternative embodiments, part or all, of the baseband processing circuitry and application processing circuitry may be combined into one microchip or set of chips, and the RF transceiver circuitry may be on a separate microchip or set of chips. In still alternative embodiments, part or all of the RF transceiver circuitry and baseband processing circuitry may be on the same microchip or set of chips, and the application processing circuitry may be on a separate microchip or set of chips. In yet other alternative embodiments, part, or all, of the RF transceiver circuitry, baseband processing circuitry, and application processing circuitry may be combined in the same microchip or set of chips. Processing circuitry 215 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by processing circuitry 215 executing instructions stored on computer-readable storage medium 230. In alternative embodiments, some or all of the functionality may be provided by processing circuitry 215 without executing instructions stored on a computer-readable medium, such as in a hard-wired manner. In any of those particular embodiments, whether executing instructions stored on a computer-readable storage medium or not, processing circuitry 215 can be said to be configured to perform the described functionality. The benefits provided by such functionality are not limited to processing circuitry 215 alone or to other components of UE 200, but are enjoyed by UE 200 as a whole, and/or by end users and the wireless network generally.

Antenna 205, radio front-end circuitry 210, and/or processing circuitry 215 may be configured to perform any receiving operations described herein as being performed by a wireless device. Any information, data and/or signals may be received from a network node and/or another wireless device.

Processing circuitry 215 may be configured to perform any determining operations described herein as being performed by a wireless device. Determining as performed by processing circuitry 215 may include processing information obtained by processing circuitry 215 by, for example, converting the obtained information into other information, comparing the obtained information or converted information to information stored in the wireless device, and/or performing one or more operations based on the obtained information or converted information, and as a result of said processing making a determination.

Antenna 205, radio front-end circuitry 210, and/or processing circuitry 215 may be configured to perform any transmitting operations described herein as being performed by a wireless device. Any information, data and/or signals may be transmitted to a network node and/or another wireless device.

Computer-readable storage medium 230 is generally operable to store instructions, such as a computer program, software, an application including one or more of logic, rules, code, tables, etc. and/or other instructions capable of being executed by a processor. Examples of computer-readable storage medium 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 215. In some embodiments, processing circuitry 215 and computer-readable storage medium 230 may be considered to be integrated.

UE 200 includes input interface 220. Input interface 220 may comprise devices and circuits configured to allow input of information into UE 200 (e.g., from a user). Input interface 220 is connected to processing circuitry 215 to allow processing circuitry 215 to process the input information. For example, input interfaces 220 may include a microphone, a proximity or other sensor, keys/buttons, a touch display, one or more cameras, a USB port, or other input elements.

Output interface 225 may include devices and circuits configured to allow output of information from UE 200 (e.g., to a user). Output interface 225 is connected to processing circuitry 215 to allow processing circuitry 215 to output information from UE 200. For example, output interface 225 may include a speaker, a display, vibrating circuitry, a USB port, a headphone interface, or other output elements. In some embodiments, the same component may function as both an input and output interface. For example, a touch screen may output images and accept user touches as input. Using one or more input and output interfaces, devices, and circuits, UE 200 may communicate with end users and/or the wireless network, and allow them to benefit from the functionality described herein.

UE 200 includes power source 235. Power source 235 may comprise power management circuitry. Power source 235 may receive power from a power supply, which may either be comprised in, or be external to, power source 235. For example, UE 200 may comprise a power supply in the form of a battery or battery pack which is connected to, or integrated in, power source 235. Other types of power sources, such as photovoltaic devices, may also be used. As a further example, UE 200 may be connectable to an external power supply (such as an electricity outlet) via an input circuitry or interface such as an electrical cable, whereby the external power supply supplies power to power source 235. Power source 235 may be connected to those components of UE 200 that need power such as radio front-end circuitry 210, processing circuitry 215, input interface 220, output interface 225 and/or computer-readable storage medium 230 and be configured to supply UE 200, including processing circuitry 215, with power for performing the functionality described herein.

Alternative embodiments of UE 200 may include additional components beyond those shown in FIG. 2 that may be responsible for providing certain aspects of the UE's functionality, including any of the functionality described herein and/or any functionality necessary to support the solutions, features and/or benefits described herein. UE 200 may also include multiple sets of processing circuitry 215, computer-readable storage medium 230, radio circuitry 210, and/or antenna 205 for different wireless technologies integrated into wireless device 200, such as, for example, GSM, WCDMA, LTE, NR, WiFi, or Bluetooth wireless technologies. These wireless technologies may be integrated into the same or different chipsets and other components within wireless device 200.

Figure 6:
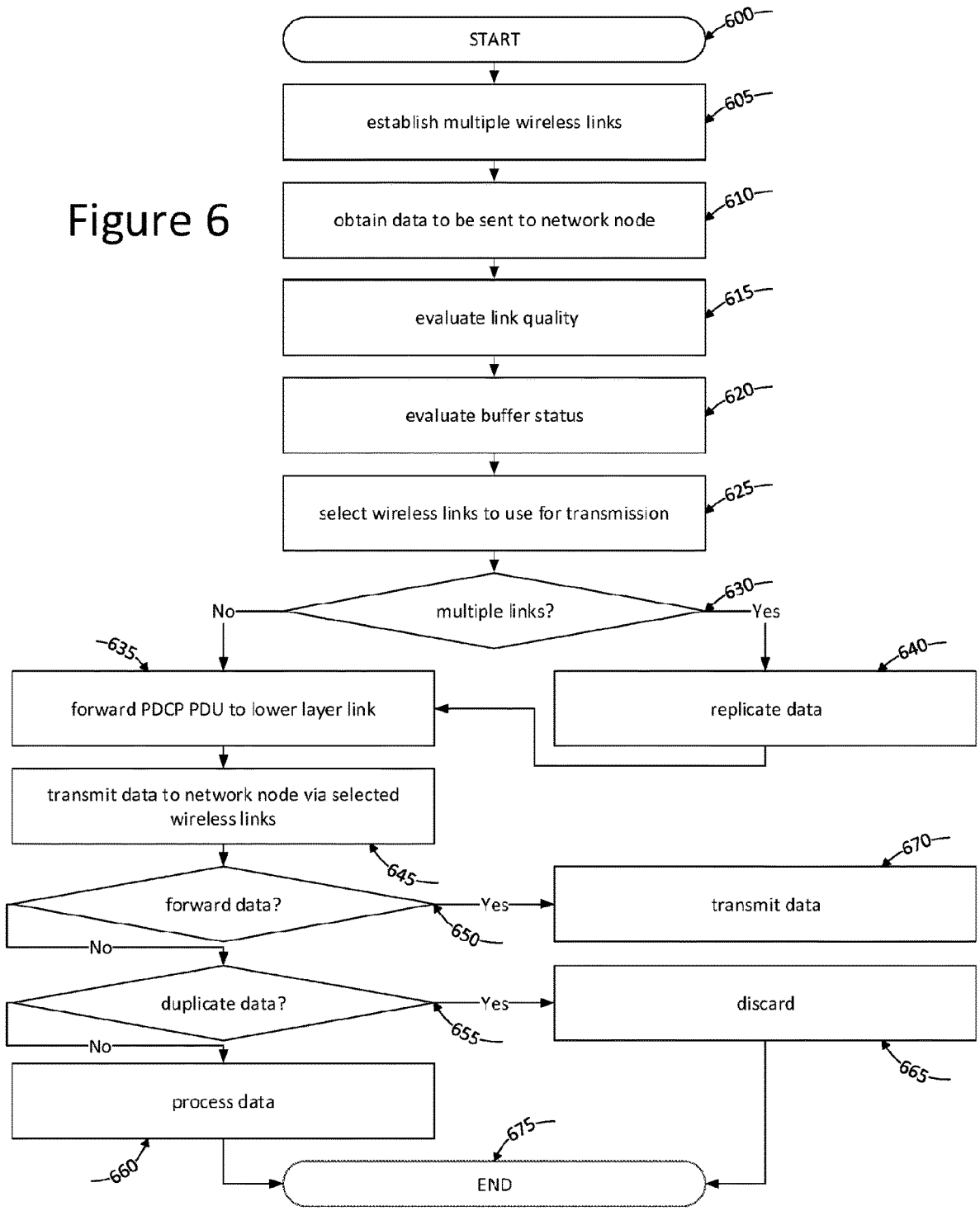
FIG. 6 is a flow chart illustrating a method for dynamic link selection according to particular embodiments.

FIG. 6 is a flow chart illustrating a method for dynamic link selection according to particular embodiments. For simplicity, the method includes steps performed by both a WD and a network node. In practice, a single device may only perform those steps relevant to the type of device. For example, a WD may select multiple links to send data, but a network node may determine whether received data is duplicative of other previously received data. While the corresponding description may describe or mention a particular device, it is not required that the discussed device perform the described step. For example, while the link selection is being performed by a wireless device sending data to a network node, a similar method may be used for data being sent to the wireless device. Similarly, as another example, a network node may function as a relay node and perform similar link selection with respect to forwarding on data as is described as being performed by a wireless device. In addition, although the depicted method involves a UE selecting the wireless link(s) to use for transmission, the selection decision can also be made by a network node before the WD transmits or a network node may make the selection and send commands to the wireless device. The command can be on physical, MAC, PDCP or RRC layer.

The method starts at step 600, at step 605 a WD establishes multiple wireless links. These wireless links may be provided by one or more network nodes. At least of the wireless links may be associated with different radio access technologies (RATs). While the RATs may be different, in some scenarios the network node may be the same. For example, an MSR may provide two different RATs with which the WD has established two different wireless links. Although step 605 shows multiple links being established, it is not required that the links be established at the same time, though they may be con-currently active. In some embodiments, as part of establishing a wireless link with a master network node, the master network node may configure whether or not the WD is allowed to use link diversity, what method of RRC diversity to use, and/or what criteria to use when selecting links.

At step 610 the WD obtains data that is to be sent to a first network node. The first network node may be associated with a first RAT and may provide at least one of the wireless links established with the WD. In some embodiments, the data to be sent may be control data associated with the first RAT. In some embodiments, the data may comprise Radio Resource Control (RRC) messages. In some embodiments, the data may be user plane data. In some embodiments the data may be control data associated with a second RAT.

At step 615 the WD evaluates the link quality associated with each of the multiple wireless links. The link quality may be evaluated based on measurements, measurement reports, or any other network parameter indicating delay or channel quality. For example, the link quality which may be used as a parameter for link selection and mapping can be based on reference signal received power (RSRP), reference signal received quality (RSRQ) or signal to interference and noise ratio (SINR) measurements. It could also be based on other parameters such as measured channel quality indicator (CQI) values or modulation and coding scheme (MCS) used in the uplink. In some embodiments, MCS history may be used to evaluate link quality. In another embodiment, link quality may be evaluated based on lower layer feedback on the delivery of a message. In some embodiments, the history of the respective parameters may be used. For example, the average value of a measurement may be used.

In certain embodiments, the delay or latency of the wireless links may be considered. Delay can be estimated either based on PDCP level delay (e.g., how long the packets are in the PDCP queue on average) or by estimating the lower layer protocol delay (e.g., the delay of RLC and/or MAC layer). RLC layer delay may include queuing in the RLC buffer whereas MAC layer delay may include hybrid automatic repeat request (HARQ) delay as well as delay to send scheduling requests. In some embodiments, delay may correspond to HARQ delay which can be calculated as a product of HARQ round trip time (RTT) and the number of HARQ transmissions for the MAC PDU. In one embodiment, the link with the lower delay is selected for the transmission of the control information.

At step 620 the WD evaluates the buffer status associated with each of the multiple wireless links. For example, if the split is on the PDCP level, the WD may estimate the available data in the lower layer buffers. In some embodiments, buffer status may be evaluated from buffer status reports associated with each of the available wireless links.

Although not illustrated, in some embodiments, the WD may evaluate the RRC message type associated with the data that is to be transmitted.

At step 625 the WD selects one or more of the multiple wireless links to use to transmit the data. The selected wireless links may include at least a second wireless link associated with a second RAT. In the illustrated method, the link may be selected based on the two selection parameters evaluated at steps 615 and 620. Other embodiments may use more, fewer, or different selection parameters. For example, one embodiment may combine the signal strength, delay and/or buffer status to make the link selection (e.g., a link is selected if the (estimated/measured/reported) signal strength is over the threshold and the estimated transmission delay and/or the buffer is smaller than in another link). In the calculation of the delay or signal strength, there can be an averaging period over which the samples are taken. The averaging period or the number of samples can be configured by the network node. In some embodiments, the WD may select multiple wireless links if the link quality of one or all of the wireless links are below a threshold.

Depending on the embodiment, the selection of wireless links may be done on a per PDCP PDU basis or on a per Radio Link Control (RLC) PDU basis. Other embodiments may make the selection based on different basis. In some embodiments, the selection decision may be made on different protocol layers, such as the RRC or PDCP layers. In some embodiments, cross-layer signalling/services may be required to enable the execution of decision on a different protocol layer (e.g., an input may be needed for a decision).

The WD may select one or more links such that control plane data is only sent on the link which has a better signal strength or quality (relative to another link). In some embodiments, the link selection may be such that control plane information is by default mapped to both/all configured links. In certain embodiments, an offset amount may be used such that control plane information is only transmitted on a single link if its link quality is an offset amount better than the other wireless links. Similarly, a threshold quality level may be used such that control plane data is sent over a single link when it's quality is above the threshold quality level, and sent over multiple wireless links if it is below the threshold quality level. In some embodiments, multiple links may be selected if the signal quality of all the available links are below a threshold amount. In certain embodiments, a wireless link may be removed from consideration for use in transmitting control data if its signal quality is below a minimum threshold. In some embodiments, if radio link failure (RLF) is expected, then the wireless link that is expected to fail may not be used or may only be used in conjunction with a secondary wireless link. Expected RLF is determined based on traditional criteria for predicting RLF (e.g., timers T310 and counters N310, N311 configured with different values).

At step 630 the method may diverge depending on whether the WD selected multiple links to use to transmit the data or only a single link.

At step 635 the WD forwards the data to be transmitted to a lower layer link (e.g., the PDCP PDU containing the data may be forwarded to a lower layer link). In some embodiments, when RRC diversity is activated, PDCP PDUs are forwarded either to one lower layer link (i.e., RLC/MAC entity) or both lower layer links by means of the dynamic link selection applied per RRC PDU/SDU or PDCP PDU basis.

At step 640, if the WD selected multiple links, the WD replicates the data so that it can be sent via the multiple wireless links. If the split is at the PDCP layer, replicating the data can be done by copying the PDCP PDU and forwarding it on to be sent out over the multiple wireless links. In this solution, the same PDCP sequence number is used in both links. If the split is made at the RRC level, the RRC PDU/SDU is copied and sent over the multiple wireless links. Although the data may be replicated, certain aspects of the transmission may be unique. For example, the headers may differ between the different transmissions.

At step 645 the data is transmitted to the first network node via the selected wireless links. If the WD selected multiple links, then the data is transmitted via the multiple links using the different RATs. If the WD selected only a single link, then the data is transmitted via the selected wireless link. Because the selected wireless link, or links, include at least the second wireless link, the data associated with the first RAT is transmitted via the second wireless link associated with the second RAT. In some embodiments where the data being transmitted is control data, the control data needed for the first wireless link may be transmitted via the second wireless link. Put another way in a specific example, LTE control data may be transmitted via a WiMax wireless link. In some embodiments, the data to be transmitted may be control plane data. Transmitting the control data may comprise forwarding a PDCP PDU to a respective lower layer link. In some embodiments the data may be user plane data.

At step 650 the method may diverge depending on whether or not the network node needs to forward the data on to another network node. If the data received by the network node is addressed to a second network node, the network node transmits the data to the second network node at step 670.

At step 655 the method may diverge depending on whether or not the data received by the network node is duplicate data.

At step 660, if the data does not need to be forwarded and it is not duplicate data, the network node may process the data in a customary fashion.

At step 665, if the data is duplicative, the network node may discard the duplicate data. In other embodiments, not illustrated herein, the duplicate data may be combined to reduce reception errors. In some embodiments, when the network node receives the data, either the first time or subsequently, the network node may inform the WD that the data has been received by sending the transaction identifier or the PDCP SN of the received data to the WD. If the split is at the RRC level, the network node can identify and discard the duplicate data based on the transaction identifier of the RRC message.

In some embodiments, for downlink messages the network node or WD may deduce that the data has been received correctly by the WD based on lower layer feedback. In the network node case, the network node may inform the other network node that it can remove the control plane information of the given PDCP PDU or the RRC PDU/SDU. This may be achieved with existing flow control information over X2* interface (see 36.423). In the uplink, the WD could be ordered to send copies of PDCP PDUs already transmitted on one link on another link if it receives a grant and it does not have data in the buffer which maps to the grant and has not yet been transmitted. This could minimize padding transmission. The method ends at step 675.

The steps described above are merely illustrative of certain embodiments. It is not required that all embodiments incorporate all the steps above nor that the steps be performed in the exact order depicted in FIG. 6. For example, in some embodiments, the WD may evaluate link quality prior to obtaining data to reduce any delay between when the WD obtains the data and transmits the data. Furthermore, some embodiments may include steps not illustrated in FIG. 6, such as those discussed above.

The steps illustrated in FIG. 6, and described above, may be performed through a computer program product that may, for example, be executed by the components and equipment illustrated in FIG. 1. For example, storage 123 may comprise computer readable media on which a computer program can be stored. The computer program may include instructions which cause processor 122 (and any operatively coupled entities and devices, such as interface 121 and storage 123) to execute methods according to embodiments described herein. The computer program and/or computer program product may thus provide means for performing any steps herein disclosed.

Figure 7:
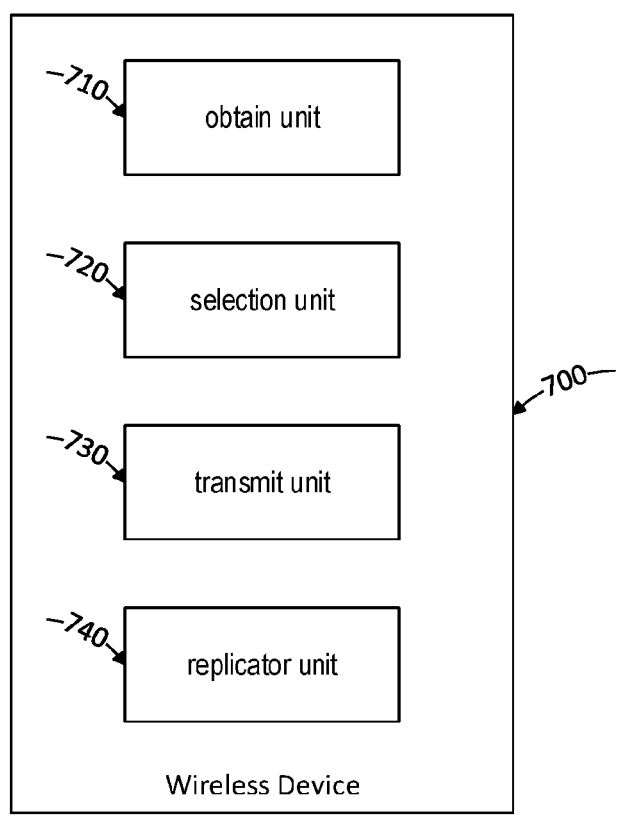
FIG. 7 is a block diagram illustrating the functional units used in dynamic link selection, according to particular embodiments.

FIG. 7 is a block diagram illustrating the functional modules used in dynamic link selection, according to particular embodiments. In particular, there is depicted the functional modules of a particular wireless device 700. As illustrated, WD 700 comprises obtain unit 710, selection unit 720, transmit unit 730, and replicator unit 740. Other embodiments may include more, fewer, or different functional units. Moreover, a single depicted unit may represent multiple similar units. In general terms, each functional unit depicted therein may be implemented in hardware and/or in software. Preferably, one or more or all functional units may be implemented by processor 112, possibly in cooperation with storage 113. Processor 112 and storage 113 may thus be arranged to allow processor 112 to fetch instructions from storage 113 and execute the fetched instructions to allow the respective functional unit to perform any steps or functions disclosed herein. The illustrated units may further be configured to perform other functions or steps not explicitly described with respect to the respective unit, including providing any features or functions disclosed with respect to any of the other figures.

Obtain unit 710 is configured to obtain data to be sent to a network node. In some embodiments, the data that is to be sent may be control data or control plane data. The control data may be related to a first wireless link. The first wireless link may be one of at least two available wireless links. The available wireless links may be using at least two different RATs (e.g., 3G and 4G RATs). For purposes of discussion, it may be assumed that the first wireless link is associated with a first radio access technology. In some embodiments, the data that is obtained by obtain unit 710 may be one or more RRC messages.

Selection unit 720 is configured to select one or more wireless links to use for the transmission of the data to be sent to the network node. The one or more wireless links are selected from a group of at least two available wireless links. The at least two available wireless links are associated with at least two different radio access technologies. In some embodiments, selection unit 720 may evaluate the link quality associated with each of the available wireless links. The relative link quality may be used in selecting which wireless link or links to use to transmit the data. In some embodiments, selection unit 720 may evaluate the buffer status associated with each of the available wireless links. The relative status of each available wireless link's buffer may be used in selecting which wireless link or links to use to transmit the data.

Transmit unit 730 is configured to transmit the data to the network node via the selected one or more wireless links. In some embodiments, transmit unit 730 may transmit control data for the first wireless link associated with the first RAT via a second wireless link associated with a different RAT. In those embodiments in which selection unit 720 selects multiple wireless links, transmit unit 730 may transmit the replicated to the network node via the multiple selected wireless links. This may allow the at least two selected wireless links to convey the same data via different radio access technologies. Where the data is transmitted via multiple wireless links, it may be the case that one or more of the wireless links will be to a network node other than the intended recipient of the data. This node may then forward the data to the intended network node. In some embodiments, the WD may be configured such that selection unit 720 selects the wireless links, and transmit unit 730 transmits the data via the selected wireless links on a per PDCP PDU basis or a per RLC PDU basis. In some embodiments, transmit unit 730 may be configured to forward a PDCP PDU to a respective lower layer link.

Replicator unit 740 is configured to replicate the data to be transmitted. The data may be replicated when the selectin unit 720 selects more than one wireless link to use to transmit the data. In some embodiments, replicating the data may comprise making an identical, or near identical, copy of the data and then creating separate formatting and header information for the respective wireless links.

Certain aspects of the inventive concept have mainly been described above with reference to a few embodiments. However, as is readily appreciated by a person skilled in the art, embodiments other than the ones disclosed above are equally possible and within the scope of the inventive concept, as defined by the appended claims. Similarly, while a number of different combinations of features and components have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for dynamic link selection comprising:
providing at least two wireless links between one or more network nodes and a wireless device the at least two wireless links associated with at least two different radio access technologies;
obtaining control data to be sent to a first network node of the one or more network nodes, the control data associated with a first radio access technology;
selecting one or more wireless links from among the at least two wireless links based on a first selection parameter, the selected one or more wireless links to be used for the transmission of the control data to the first network node, the selected one or more wireless links comprising at least a first wireless link associated with a second radio access technology;
transmitting the control data associated with the first radio access technology to the first network node via at least the first wireless links associated with the second radio access technology;
obtaining the control data at the first network node; and
determining whether the received control data is duplicated control data.

2. A method for dynamic link selection comprising:
obtaining data to be sent to a network node wherein the data to be sent comprises control data for a first wireless link of at least two available wireless links, the first wireless link is associated with a first radio access technology;
selecting one or more wireless links to use for the transmission of the data to be sent to the network node, the one or more wireless links selected from a group of the at least two available wireless links, the at least two available wireless links associated with at least two different radio access technologies; and
transmitting the data to the network node via the selected one or more wireless links wherein transmitting the data to the network node comprises transmitting the control data via at least a second wireless link of the at least two available wireless links, the second wireless link is associated with a second radio access technology different than the first radio access technology.

3. The method of claim 2, further comprising, upon selecting at least two wireless links from the group of at least two available wireless links:
replicating the data to be transmitted;
transmitting the replicated data to the network node via the at least two selected wireless links, the at least two selected wireless links conveying the same data via different radio access technologies;
wherein the data transmitted on at least one of the selected wireless links is transmitted to the network node via a second network node.

4. The method of claim 2, wherein selecting one or more wireless links to use for the transmission of the data comprises evaluating a link quality associated with each of the wireless links of the group of at least two available wireless links.

5. The method of claim 2, wherein selecting one or more wireless links to use for the transmission of the data comprises evaluating buffer status associated with each of the wireless links of the group of at least two available wireless links.

6. The method of claim 2:
wherein the data to be sent is control plane data; and
transmitting the data comprises, for each selected wireless link, forwarding a Packet Data Convergence Protocol (PDCP) Protocol Data Unit (PDU) to a respective lower layer link.

7. The method of claim 2, wherein selecting the one or more wireless links is done on a per Packet Data Convergence Protocol (PDCP) Protocol Data Unit (PDU) basis.

8. The method of claim 2, wherein selecting the one or more wireless links is done on a per Radio Link Control (RLC) Protocol Data Unit (PDU) basis.

9. The method of claim 2, wherein the data comprises Radio Resource Control (RRC) messages.

10. A wireless device for dynamic link selection comprising:
processing circuitry configured to:
obtain control data to be sent to a network node;
select one or more wireless links to use for the transmission of the control data to be sent to the network node, the one or more wireless links selected from a group of at least two available wireless links, the at least two available wireless links associated with at least two different radio access technologies;
a wireless interface configured to transmit the control data to the network node via the selected one or more wireless links, wherein the network node is associated with a first radio access technology of the at least two different radio access technologies and the selected one or more wireless links comprises at least one link associated with a second radio access technology of the at least two different radio access technologies;
a user interface; and
a power source configured to provide the wireless device with power.

11. The wireless device of claim 10, wherein:
the processing circuitry is further configured, upon selecting at least two wireless links from the group of at least two available wireless links, to replicate the control data to be transmitted; and
the wireless interface is further configured to transmit the replicated control data to the network node via the at least two selected wireless links, the at least two selected wireless links conveying the same control data, wherein the control data transmitted on at least one of the selected wireless links is transmitted to the network node via a second network node.

12. The wireless device of claim 10, wherein the processing circuitry configured to select one or more wireless links to use for the transmission of the control data is further configured to evaluate a link quality associated with each of the wireless links of the group of at least two available wireless links.

13. The wireless device of claim 10, wherein the processing circuitry configured to select one or more wireless links to use for the transmission of the control data is further configured to evaluate buffer status associated with each of the wireless links of the group of at least two available wireless links.

14. The wireless device of claim 10, wherein:
the control data to be sent is control plane data; and
the wireless interface configured to transmit the control data is further configured, for each selected wireless link, to forward a Packet Data Convergence Protocol (PDCP) Protocol Data Unit (PDU) to a respective lower layer link.

15. The wireless device of claim 10, wherein the processing circuitry configured to select the one or more wireless links is further configured to select the one or more wireless links on a per Packet Data Convergence Protocol (PDCP) Protocol Data Unit (PDU) basis.

16. The wireless device of claim 10, wherein the processing circuitry configured to select the one or more wireless links is further configured to select the one or more wireless links on a per Radio Link Control (RLC) Protocol Data Unit (PDU) basis.

17. The wireless device of claim 10, wherein the control data comprises Radio Resource Control (RRC) messages.

18. A network node for dynamic link selection comprising:
a wireless interface configured to provide at least a first wireless link for wireless communication with a wireless device, the first wireless link associated with a first radio access technology;
a second interface configured to obtain control data from the wireless device, the control data transmitted by the wireless device via a second wireless link, the second wireless link associated with a second radio access technology different than the first radio access technology; and
processing circuitry configured to determine whether the received control data is duplicated control data.

19. A wireless device for dynamic link selection comprising a processor and computer readable storage media, the storage media containing instructions executable by the processor, whereby the wireless device is operative to:
obtain control data to be sent to a network node;
select one or more wireless links to use for the transmission of the control data to be sent to the network node, the one or more wireless links selected from a group of at least two available wireless links, the at least two available wireless links associated with at least two different radio access technologies; and
transmit the control data to the network node via the selected one or more wireless links, wherein the network node is associated with a first radio access technology of the at least two different radio access technologies and the selected one or more wireless links comprises at least one link associated with a second radio access technology of the at least two different radio access technologies.

20. The wireless device of claim 19, wherein the wireless device is further operative to, upon selecting at least two wireless links from the group of at least two available wireless links:
replicate the control data to be transmitted;
transmit the replicated control data to the network node via the at least two selected wireless links, the at least two selected wireless links conveying the same control data via different radio access technologies;
wherein the control data transmitted on at least one of the selected wireless links is transmitted to the network node via a second network node.

21. The wireless device of claim 19, wherein the wireless device operative to select one or more wireless links to use for the transmission of the control data is further operative to evaluate a link quality associated with each of the wireless links of the group of at least two available wireless links.

22. The wireless device of claim 19, wherein the wireless device operative to select one or more wireless links to use for the transmission of the control data is further operative to evaluate buffer status associated with each of the wireless links of the group of at least two available wireless links.

23. The wireless device of claim 19:
   wherein the control data to be sent is control plane data; and
   the wireless device operative to transmit the control data is further operative to, for each selected wireless link, forward a Packet Data Convergence Protocol (PDCP) Protocol Data Unit (PDU) to a respective lower layer link.

24. The wireless device of claim 19, wherein the one or more wireless links are selected on a per Packet Data Convergence Protocol (PDCP) Protocol Data Unit (PDU) basis.

25. The wireless device of claim 19, wherein the one or more wireless links are selected on a per Radio Link Control (RLC) Protocol Data Unit (PDU) basis.

26. The wireless device of claim 19, wherein the control data comprises Radio Resource Control (RRC) messages.

\* \* \* \* \*